United States Patent
Igari

(10) Patent No.: US 7,265,923 B2
(45) Date of Patent: Sep. 4, 2007

(54) APPARATUS AND METHOD FOR CONTROLLING INHIBITION OF DATA WRITING IN DISK DRIVE

(75) Inventor: Fubito Igari, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 658 days.

(21) Appl. No.: 10/767,449

(22) Filed: Jan. 30, 2004

(65) Prior Publication Data

US 2004/0240095 A1 Dec. 2, 2004

(30) Foreign Application Priority Data

Jan. 31, 2003 (JP) ............................. 2003-023874

(51) Int. Cl.
 *G11B 5/09* (2006.01)
 *G11B 20/10* (2006.01)
 *G11B 19/04* (2006.01)
(52) U.S. Cl. ..................................... 360/60; 369/53.21
(58) Field of Classification Search ..................... None
 See application file for complete search history.

(56) References Cited

U.S. PATENT DOCUMENTS 4,825,309 A 4/1989 Shoji et al.
6,496,315 B1 12/2002 Ueda et al.

2006/0171053 A1* 8/2006 Sai et al. ....................... 360/55

FOREIGN PATENT DOCUMENTS

| EP | 0 270 057 A1 | 6/1988 |
| JP | 10-241289 | 9/1998 |
| JP | 2000-298934 | 10/2000 |
| JP | 2001-014606 | 1/2001 |

OTHER PUBLICATIONS

Austrian Patent Office Search Report dated Jun. 14, 2004.
Japanese Office Action dated Feb. 14, 2006 for Appln. No. 2003-023874.

* cited by examiner

*Primary Examiner*—Andrea Wellington
*Assistant Examiner*—Dan I Davidson
(74) *Attorney, Agent, or Firm*—Pillsbury Winthrop Shaw Pittman, LLP

(57) ABSTRACT

An HDC has first and second terminals. The first terminal is used to output a first write gate signal that dictates writing of data to the disk. The second terminal is used to input a second write gate signal output from an external circuit. The external circuit performs predetermined signal processing on write data in accordance with the first write gate signal output from the first terminal, and outputs the second write gate signal that reflects a signal delay in the circuit. A write inhibition controller incorporated in the HDC monitors the second write gate signal input via the second terminal, and detects, as a write inhibition state, a state in which writing of data to the disk is dictated during a period in which writing of data to the disk should be inhibited.

10 Claims, 6 Drawing Sheets

APPARATUS AND METHOD FOR CONTROLLING INHIBITION OF DATA WRITING IN DISK DRIVE

CROSS-REFERENCE TO RELATED APPLICATIONS

This application is based upon and claims the benefit of priority from the prior Japanese Patent Application No. 2003-023874, filed Jan. 31, 2003, the entire contents of which are incorporated herein by reference.

BACKGROUND OF THE INVENTION

1. Field of the Invention

The present invention relates to a disk drive equipped with a disk controller for controlling reading and writing of data from and to a disk, and more particularly to an apparatus and method for controlling the inhibition of data writing in the disk drive.

2. Description of the Related Art

In magnetic disk drives (HDDs), a head (magnetic head) is used to read and write data from and to a disk (magnetic recording medium). The reading and writing of data using the head is performed by a head amplifier circuit (head IC) via a signal processing circuit called a read/write channel. In general, recent read/write channels perform digital signal processing called partial response maximum likelihood (PRML) detection. Further, there is a tendency for the frequency of a signal processed by the read/write channel to increase in accordance with increases in the recording density of magnetic disk drives. The higher the signal frequency, the lower the signal quality. In light of this, recent read/write channels perform complex encoding that can compensate for degradation of signal quality.

In a magnetic disk drive equipped with such a read/write channel, the read error ratio is rather low. However, since encoding is very complex, there is a tendency for a signal delay time due to encoding (i.e., an encoding delay time) and another due to decoding of an encoded signal to increase. In a write operation, for example, when a disk controller has output write data corresponding to one sector to a read/write channel, the output of data from the read/write channel is delayed by the encoding delay time. Therefore, until the output of data from the read/write channel to the head amplifier circuit finishes, it is necessary to keep asserted a write gate signal used in the head amplifier circuit (i.e., keep this signal activated). The write gate signal is a signal (write allowance signal) for allowing data to be written to the disk.

The longer the encoding delay time, the more writing of data to a subsequent sector is delayed. For example, assume that one sector is of 512 bytes, and the read/write channel needs an encoding delay time corresponding to the time required to write data of 30 bytes. In this case, the disk controller needs to keep the write gate signal asserted for the time required to write data of 30 bytes, after outputting write data of one sector (512 bytes). In other words, unless the time (encoding delay time) required for writing data of 30 bytes elapses after one sector data is output, the disk controller cannot process data to be written to the next sector. The time interval from the finish of the output of one sector data to the start of processing of the next sector data is called an inter-sector gap.

There is a recent demand for shortening the inter-sector gap that occurs due to encoding delay in the read/write channel. Jpn. Pat. Appln. KOKAI Publication No. 2000-298934 has proposed a technique (hereinafter referred to as "prior art") using two types of write gate signal, i.e., first and second write gate signals. The first gate signal is used by a read/write channel, while the second gate signal is output from the read/write channel to a head amplifier circuit and used by the circuit. This prior art is characterized in that the read/write channel controls the second write gate signal based on the progress of encoding in the read/write channel itself. In the prior art, the read/write channel asserts the second write gate signal until one sector data to be written is completely output. In other words, the read/write channel controls the second write gate signal for the time required to completely output data. On the other hand, the disk controller only outputs data to the read/write channel and controls the first write gate signal corresponding to the data output. Therefore, the read/write channel can control the timing of data writing in a reliable manner, while the disk controller does not have to consider the encoding delay in the read/write channel, and therefore can secure a sufficient time for preparing the writing of data to the next sector.

In the above-described prior art, the timing of outputting the first write gate signal from the disk controller to the read/write channel differs from that of outputting the second write gate signal from the read/write channel to the head amplifier circuit. Therefore, even if the second write gate signal is output when writing of data should be inhibited, the disk controller cannot detect the output timing of the second write gate signal. In other words, since the second write gate signal used by the head amplifier circuit is output from the read/write channel, the disk controller cannot detect the output timing of the second write gate signal.

As a typical time of inhibiting the writing of data, the time of a servo detection mode, set for reading servo data from the disk, is known. Servo data contains position information used to position the head over a target position. In general, servo data contains a servo mark for identifying the servo data. When the head detects the servo mark, a servo identification signal is asserted in accordance with the detection. During the period in which the servo identification signal is asserted, servo data can be reliably read by the head. Therefore, during this period, the read/write channel is switched to a servo detection mode to detect servo data. In other words, servo data is being written to the area on the disk over which the head passes during the period in which the servo identification signal is asserted.

If data is written to the disk for some reason when the second write gate signal and servo identification signal are asserted simultaneously, servo data on the disk is corrupted. However, in the prior art, the first write gate signal that can be monitored by the disk controller is negated before the assertion of the servo identification signal. Accordingly, even if the disk controller monitors the first write gate signal, it cannot detect whether data is written to the disk, during the period in which the servo identification signal is asserted (i.e., during the period in which data writing should be inhibited).

BRIEF SUMMARY OF THE INVENTION

According to an embodiment of the invention, there is provided a disk controller for controlling reading and writing of data from and to a disk. The disk controller comprises: a first terminal used to output a first write gate signal which dictates writing data to the disk; a second terminal used to input a second write gate signal output from an external circuit, the external circuit performing predetermined signal processing on write data in accordance with the first write gate signal output from the first terminal, and outputting the second write gate signal, the second write gate signal reflecting a signal delay in the predetermined signal processing; and a write inhibition controller which monitors the second write gate signal input via the second terminal, and detects, as a write inhibition state, a state in which writing data to the disk is dictated during a period in which writing data to the disk should be inhibited.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
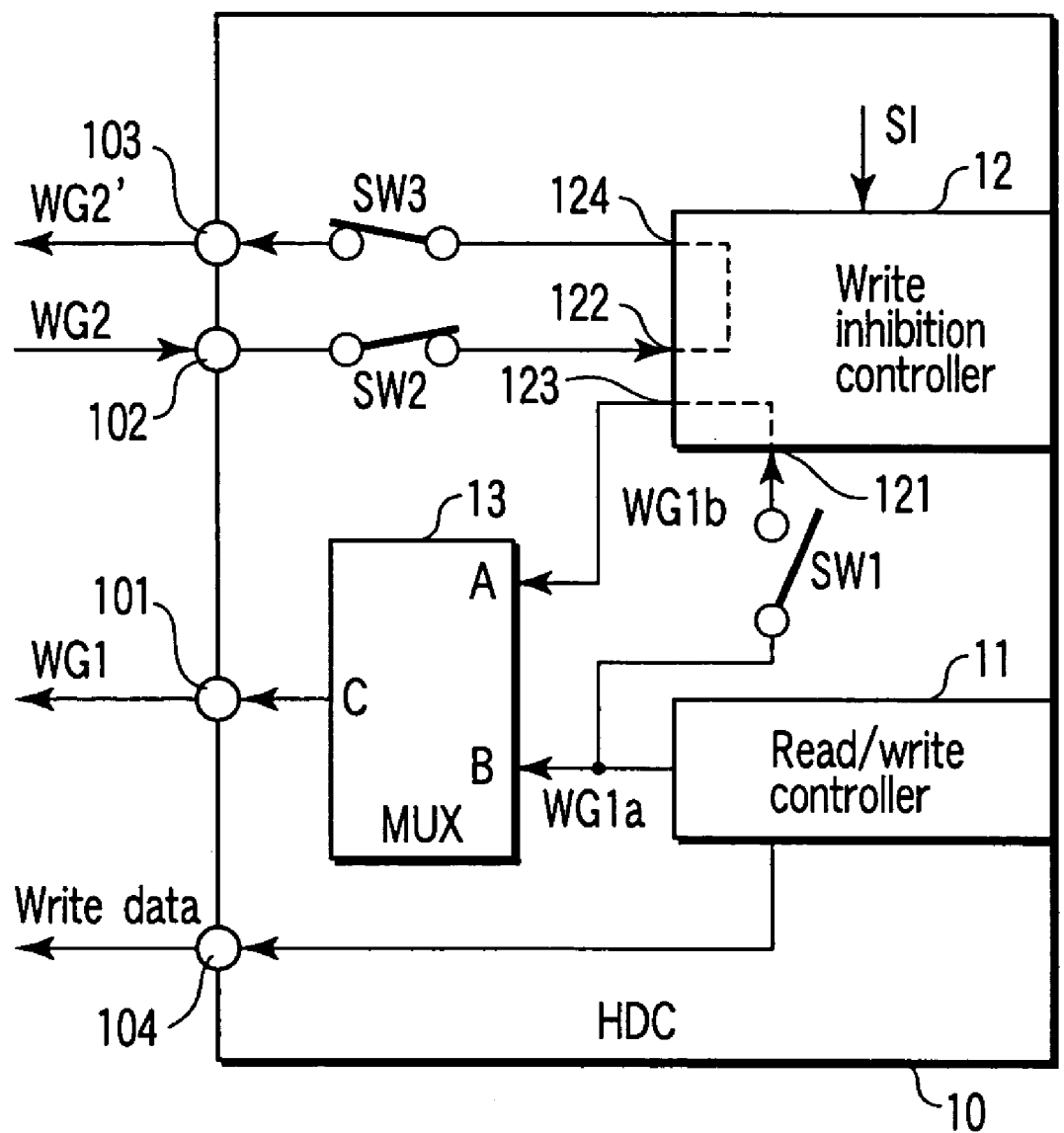
FIG. 1 is a block diagram illustrating the structure of a disk controller (HDC) according to an embodiment of the invention.

An embodiment in which the invention is applied to a magnetic disk drive will be described with reference to the accompanying drawings. FIG. 1 is a block diagram illustrating the structure of a disk controller (hereinafter referred to as an "HDC") 10 according to the embodiment of the invention. The HDC 10 is a one-chip integrated circuit (IC). The HDC 10 comprises a read/write controller 11, write inhibition controller 12, multiplexer (hereinafter referred to as a "MUX") 13 and switches SW1, SW2 and SW3. The HDC 10 further comprises terminals 101, 102, 103 and 104. The terminal 101 is used to output a write gate signal (first write gate signal) WG1, and the terminal 102 is used to receive a write gate signal (second write gate signal) WG2. The terminal 103 is used to output a write gate signal (fourth write gate signal) WG2', while the terminal 104 is used to output write data.

The read/write controller 11 controls reading of data from a disk 40 (see FIG. 2 or 5) and writing of data to the disk 40 in units of sectors. During data writing control, the read/write controller 11 asserts a write gate signal (third write gate signal) WG1a in units of sectors, and outputs write data in units of sectors. The write data output from the read/write controller 11 is sent to the terminal 104. The period (assert period) in which the write gate signal WG1a is asserted can be varied. The assert period is varied by switching in accordance with the operation mode. For example, in a first mode, the assert period is set regardless of an encoding delay time in a read/write channel 20 (see FIG. 2) that is connected to the HDC 10 of FIG. 1. On the other hand, in a second mode, the assert period is set in consideration of the encoding delay time. Alternatively, the assert period may be set considering the total signal delay time, including the encoding delay time, that occurs between a head IC 30 (see FIG. 2 or 5) and HDC 10. The head IC 30 is a circuit (head amplifier circuit of one chip) for writing data to the disk 40 using a head 50 (see FIG. 2 or 5). The HDC 10 is a circuit for initially outputting the write gate signals.

In the first mode, the HDC 10 is used, connected to the first read/write channel 20. The first read/write channel 20 controls the write gate signal WG2 in accordance with the progress of encoding in the channel 20. The first read/write channel 20 is similar to that used in conventional HDDs. In the second mode, the HDC 10 is used, connected to a second read/write channel 200. Unlike the first read/write channel 20, the second read/write channel 200 does not have a function for controlling the write gate signals.

The write inhibition controller 12 has write gate signal input ports 121 and 122 for receiving the write gate signals WG1a and WG2, respectively, and write gate signal output ports 123 and 124 for outputting the write gate signals WG1b and WG2', respectively. The write inhibition controller 12 detects whether the HDD is in a write inhibition state in which writing of data to the disk 40 is inhibited. In this embodiment, when a servo identification signal SI, described later, is valid, the write inhibition controller 12 detects the write inhibition state, using, as a requirement for write inhibition, that the write gate signal WG2 or WG1a is asserted. Specifically, in the first mode, the write inhibition controller 12 detects the write inhibition state by monitoring the servo identification signal SI and write gate signal WG2. The write gate signal WG2 is input from the outside (in this case, the read/write channel 20 shown in FIG. 2) of the write inhibition controller 12 to the input port 122 of the controller 12 via the terminal 102 and switch SW2. Further, in the second mode, the write inhibition controller 12 detects, from the servo identification signal SI and write gate signal WG1a, whether the write inhibition requirement is satisfied. The write gate signal WG1a is input from the read/write controller 11 to the input port 121 of the write inhibition controller 12 via the switch SW1. While detecting that the write inhibition requirement is satisfied (i.e., the write inhibition state is established), the write inhibition controller 12 negates the write gate signal WG2 or WG1a. The write inhibition controller 12 outputs, as the write gate signal WG2' or WG1b, the write gate signal WG2 or WG1a negated during that period through the output port 124 or 123. Thus, the write inhibition controller 12 has a function (write inhibition control function) for inhibiting writing of data to the disk 40 during the period in which the write inhibition state is detected, in addition to the function for detecting the write inhibition state.

The MUX 13 is a two-input/one-output multiplexer having inputs A and B and output C. The input A of the MUX 13 is connected to the write gate signal WG1b (fifth write gate signal) output from the write inhibition controller 12. The input B of the MUX 13 is connected to the write gate signal WG1a output from the read/write controller 11. The output C of the MUX 13 is connected to the terminal 101 of the HDC 10. The write gate signal selected by the MUX 13 is output as the write gate signal WG1 to the outside of the HDC 10 via the terminal 101. The MUX 13 selects the input A or B in accordance with the operation mode. Specifically, the MUX 13 selects the input B in the first mode, and the input A in the second mode. Accordingly, in the first mode, the write gate signal WG1a is output as the write gate signal WG1 through the terminal 101. In the second mode, the write gate signal WG1*b* is output as the write gate signal WG1 through the terminal 101. In other words, in the first mode, the MUX 13 selects the direct use of the write gate signal WG1*a* output from the read/write controller 11 as the write gate signal WG1. On the other hand, in the second mode, the MUX 13 selects the use, as the write gate signal WG1, of the write gate signal WG1*a* (i.e., the write gate signal WG1*b*) controlled by the write inhibition controller 12.

The switch SW1 is set in the OFF (open) state in the first mode, and set in the ON (closed) state in the second mode. When the switch SW1 is in the ON state, the write gate signal WG1*a* output from the read/write controller 11 is transmitted to the input port 121 of the write inhibition controller 12. That is, the switch SW1 is a gate circuit for selecting whether the input, to the write inhibition controller 12, of the write gate signal WG1*a* output from the read/write controller 11 should be permitted.

The switch SW2 is set in the ON state in the first mode, and set in the OFF state in the second mode. When the switch SW2 is in the ON state, the write gate signal WG2 transmitted from the outside (specifically, the read/write channel 20) to the terminal 102 is input to the input port 122 of the write inhibition controller 12. That is, the switch SW2 is a gate circuit for selecting whether the input, to the write inhibition controller 12, of the write gate signal WG2 output from the outside (the read/write channel 20) should be permitted.

The switch SW3 is set in the ON state in the first mode, and set in the OFF state in the second mode. When the switch SW3 is in the ON state, the write gate signal WG2' output from the output port 124 of the write inhibition controller 12 is transmitted to the terminal 103. That is, the switch SW3 is a gate circuit for selecting whether the output (to the head IC 30 in FIG. 2) of the write gate signal WG2' from the terminal 103 should be permitted. The write gate signal WG2' is a write gate signal controlled by the write inhibition controller 12 so that write data is prevented from being written to the disk 40 when writing of data to the disk 40 is inhibited.

Figure 2:
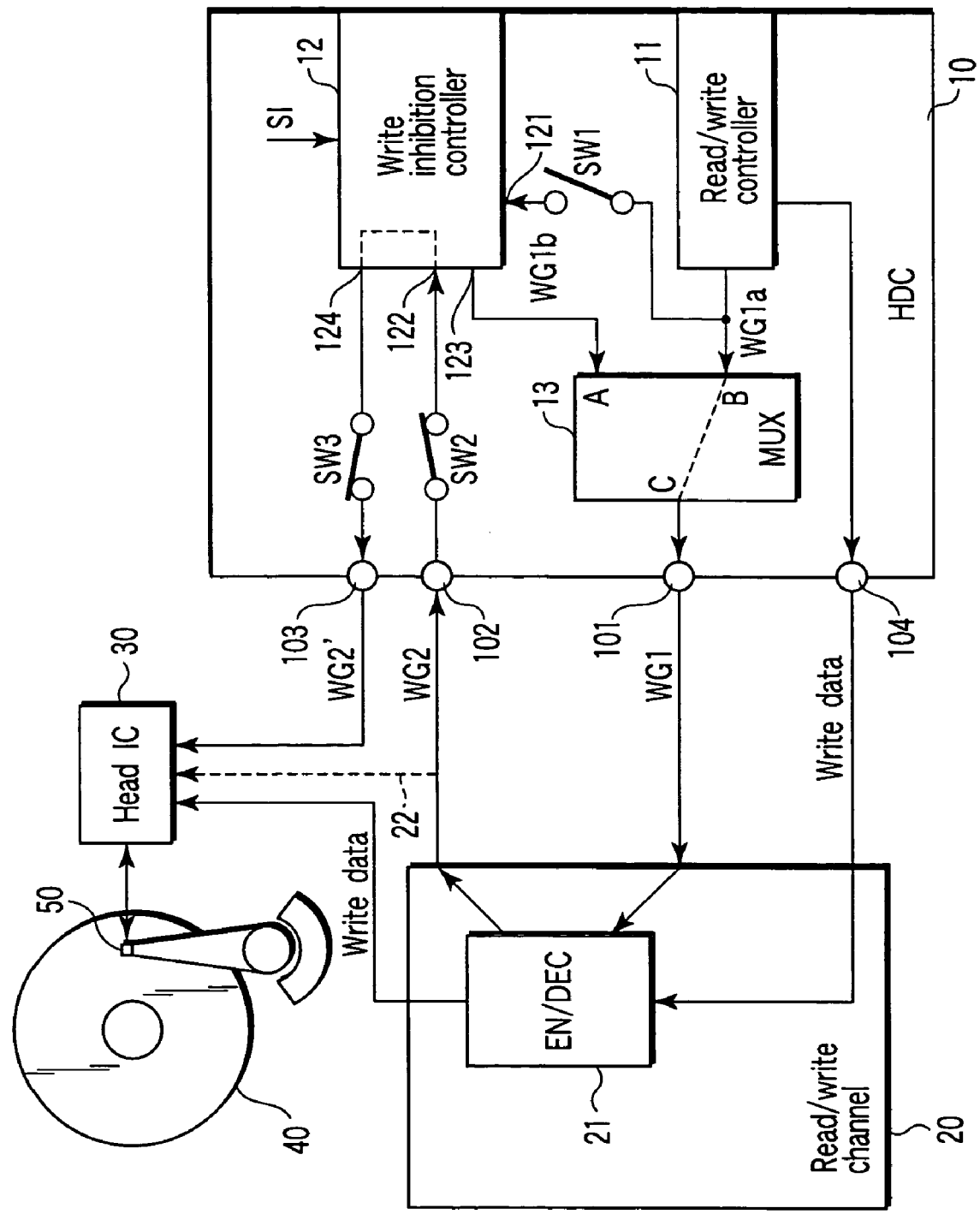
FIG. 2 is a block diagram of an essential part of a magnetic disk drive (HDD), useful in explaining the case where the disk controller shown in FIG. 1 is used in a first mode.

FIG. 2 is a block diagram of an essential part of the HDD, useful in explaining the case where the HDC 10 of FIG. 1 is used in the first mode. In FIG. 2, elements similar to those in FIG. 1 are denoted by corresponding reference numerals. As seen from FIG. 2, the HDC 10 is connected to the first read/write channel 20. The read/write channel 20 is connected to the head IC (head amplifier circuit) 30. The read/write channel 20 comprises an encoder/decoder (hereinafter referred to as an "ENDEC") 21. The ENDEC 21 has a function for encoding the write data transferred from the HDC 10 via the terminal 104, and has a function for receiving, via the head IC 30, the data read from the disk 40, and decoding it. FIG. 2 does not show, for example, an analog filter for removing noise contained in the read signal amplified by the head IC 30, or a digital-to-analog converter for converting the noise-removed read signal into a digital signal, which are incorporated in the read/write channel 20. The ENDEC 21 receives the write gate signal WG1 output through the terminal 101 of the HDC 10, and outputs a write gate signal WG2 based on the write gate signal WG1. The ENDEC 21 controls the write gate signal WG2 in accordance with the progress of encoding in the ENDEC 21 itself. The head IC 30 is connected to the HDC 10 and read/write channel 20. For data writing, the head IC 30 controls the head 50 to write, to the disk 40, the write data output from the read/write channel 20, in accordance with the write gate signal WG2' output from the terminal 103 of the HDC 10. The disk 40 has two (i.e., upper and lower) disk surfaces. At least one of the two surfaces serves as a recording surface on which data is magnetically recorded. The head 50 is located corresponding to the recording surface of the disk 40.

Figure 3:
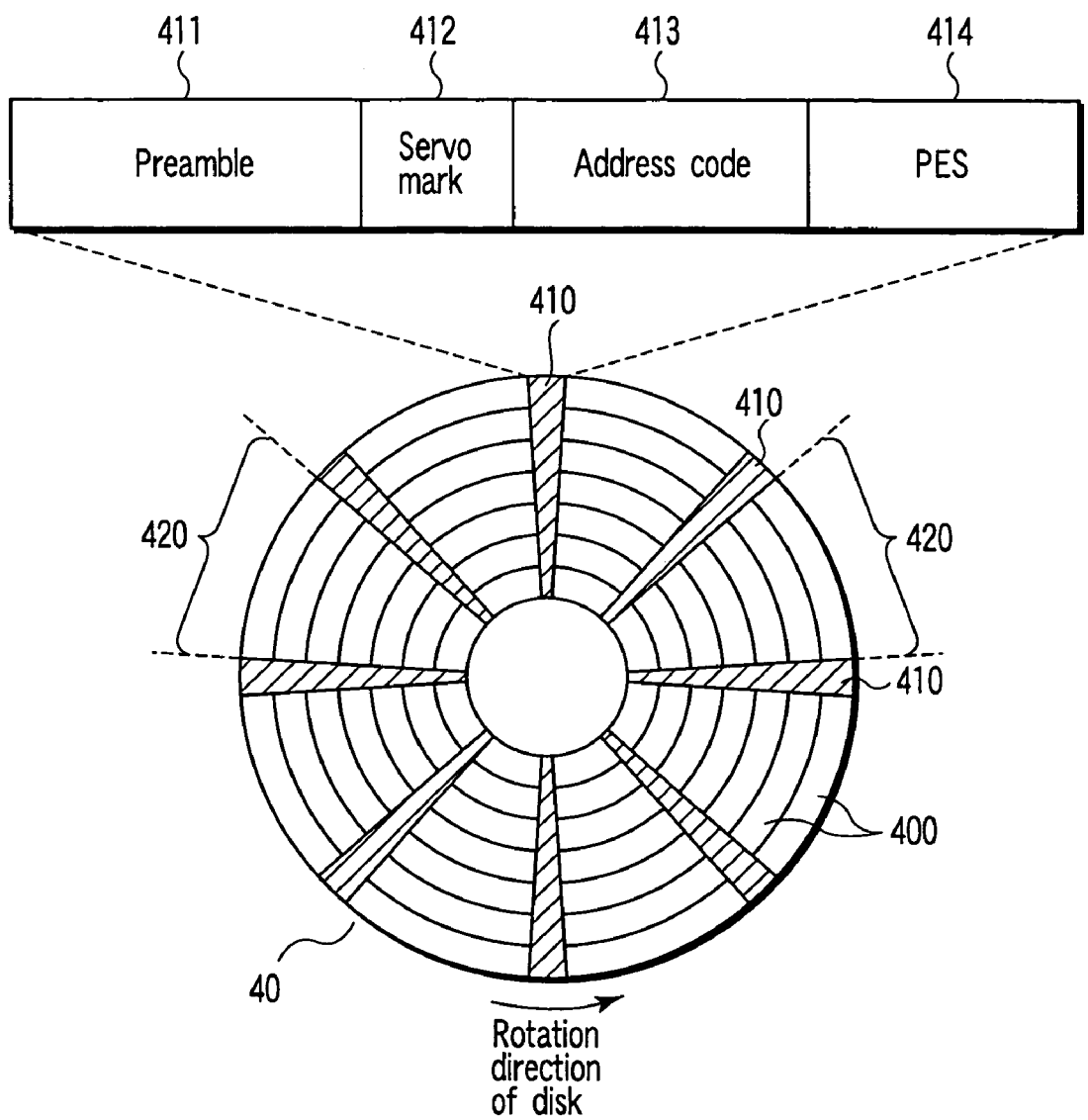
FIG. 3 shows the format of the disk 40 appearing in FIG. 2 and the format of each servo area 410 provided in the disk 40.

FIG. 3 shows the format of the disk 40 shown in FIG. 2 and the format of servo data. As shown in FIG. 3, the recording surface of the disk 40 is provided with a large number of concentric tracks 400. The recording surface is also provided with a number of servo areas 410 extending radially and located at circumferentially regular intervals. The area between each pair of adjacent servo areas 410 is used as a user data area 420. A plurality of data sectors (not shown) are provided in each user data area 420. Each servo area 410 contains servo data. Servo data comprises a preamble 411, servo mark 412, address code 413 and position error signal (hereinafter referred to as a "PES") 414. The preamble 411 contains an auto gain control (AGC) signal of a predetermined frequency used to stabilize the amplitude of a read signal. The servo mark 412 is a particular code (pattern signal) for identifying servo data (each servo area 410). The address code 413 comprises a cylinder code (cylinder number) and sector code (sector number). The cylinder code indicates the position of each cylinder (track) on the disk 40. The sector code indicates the position of each servo area 410 on each cylinder (track). The PES 414 is a burst signal that indicates the relative position of the head (i.e., an error in the position of the head) on each cylinder. The address code 413 (more specifically, the cylinder code in the address code) and PES 414 are position information used to position the head 50 in a target position on the disk 40.

Figure 4:
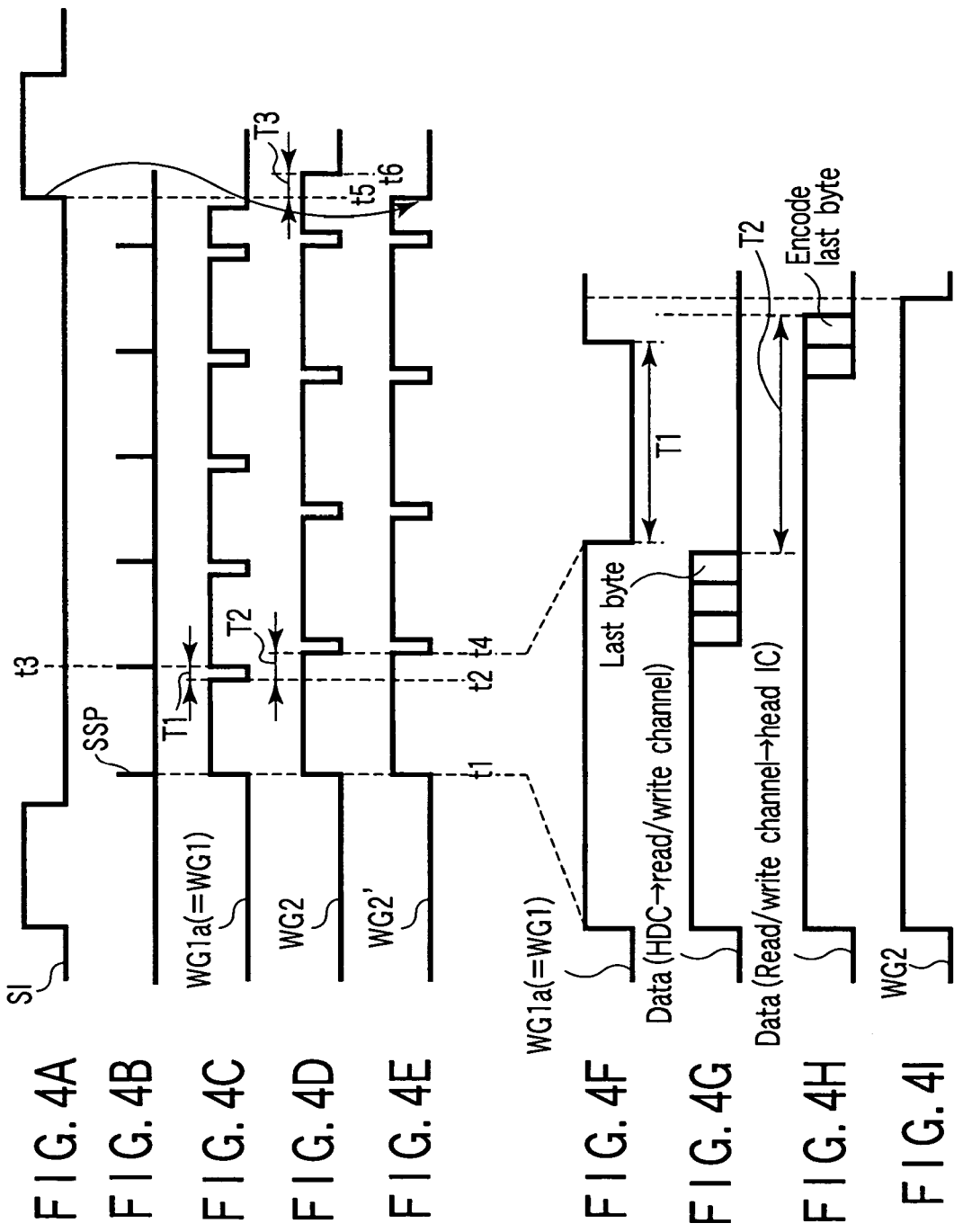
FIGS. 4A to 4I are timing charts of signals output during data writing.

Referring to the timing charts of FIGS. 4A to 4I, the data writing operation of the HDD of FIG. 2 will be described. Firstly, the HDC 10 is set in the first mode. At this time, the MUX 13 is set to select the input B. Further, the switches SW1, SW2 and SW3 are set in the OFF, ON and ON states, respectively, as shown in FIG. 2. The read/write controller 11 in the HDC 10 detects the start position SSP (see FIG. 4B) of the sector (target sector) on the disk 40, into which data is to be written. At a time point t1 at which the position SSP is detected, the read/write controller 11 asserts the write gate signal WG1*a* as shown in FIG. 4C or 4F. At the time point t1, the write gate signal WG1*a* is shifted from the low level to the high level.

Subsequently, the read/write controller 11 outputs one-sector data (write data) to be written into the target sector in units of bytes as shown in FIG. 4G. This write data is transmitted via the terminal 104 of the HDC 10 to the read/write channel 20 connected thereto. Assume that the read/write controller 11 finishes the output of the one-sector write data at a time point t2. At this time, the read/write controller 11 negates the write gate signal WG1*a* as shown in FIG. 4C or 4F, without considering the encoding delay time in the read/write channel 20. As a result, the HDC 10 can secure, as a preparation period for writing data to the next sector, the period T1 ranging from the time point t2 to a time point t3 at which the start position of the next sector is detected. At the time point t2, the write gate signal WG1*a* is shifted from the high level to the low level.

The MUX 13 selects the write gate signal WG1*a* output from the read/write controller 11, and outputs it as the write gate signal WG1 through the terminal 101. At this time, the switch SW1 is in the OFF state. Accordingly, the write gate signal WG1*a* is prevented from being input to the write inhibition controller 12. Thus, in the first mode, the write gate signal WG1*a* is prevented from being used for data write inhibition control. The write gate signal WG1 (=WG1a) output from the terminal 101 of the HDC 10 is supplied to the ENDEC 21 in the read/write channel 20 connected to the HDC 10. As mentioned above, the read/write channel 20 is supplied with the one-sector write data, shown in FIG. 4G, output from the read/write controller 11 in units of bytes. The ENDEC 21 receives this write data in accordance with the write gate signal WG1 (=WG1a), and encodes it. At this time, based on the write gate signal WG1 (=WG1a) shown in FIG. 4C or 4F, the ENDEC 21 generates the write gate signal WG2 shown in FIG. 4D or 4I, which reflects a delay in a data output caused by the encoding process in the ENDEC 21. The period in which the write gate signal WG2 is asserted is made longer, by the encoding delay time T2, than the period in which the write gate signal WG1 (=WG1a) is asserted. In other words, the period in which the write gate signal WG2 is asserted is made longer by the period T2 ranging from the time point t2 at which the write gate signal WG1 (=WG2a) is negated, to a time point t4 at which encoding of the one-sector write data completely finishes (T2=t4−t2).

The write gate signal WG2 generated by the ENDEC 21 is output to the outside of the read/write channel 20. In the previously mentioned prior art, the write gate signal WG2 is transmitted to and used by the head IC 30. On the other hand, in the embodiment, the write gate signal WG2 is transmitted to the terminal 102 of the HDC 10. This means that the write gate signal WG2, whose assertion period is made longer than the write gate signal WG1 (=WG1a) by the encoding delay period T2 by the ENDEC 21 of the read/write channel 20, is returned to the terminal 102 of the HDC 10 without being transmitted to the head IC 30. At this time, the switch SW2 connected to the terminal 102 is in the ON state. Accordingly, the switch SW2 selects the write gate signal WG2 transmitted from the ENDEC 21 of the read/write channel 20 to the terminal 102 of the HDC 10. The write gate signal WG2 selected by the switch SW2 is input to the input port 122 of the write inhibition controller 12.

The servo identification signal SI shown in FIG. 4A is also input to the write inhibition controller 12. The servo identification signal SI is a so-called servo gate signal indicating that the head 50 is on a servo area 410 of the disk 40. The servo identification signal SI is asserted while the head 50 is passing through the servo area 410. Specifically, the servo identification signal SI is asserted in accordance with the detection of the servo mark 412 of servo data written in the servo area 410 by the servo mark detection circuit (not shown) of the HDC 10. More specifically, the servo identification signal SI is asserted for the period corresponding to the servo area 410 that is subsequent to the servo area 410 having its servo mark 412 detected. If data is written to the disk 40 when the servo identification signal SI is asserted, i.e., when the signal SI is valid, the servo data written in the servo area 410 in which the head 50 is positioned will be broken.

To avoid this, the write inhibition controller 12 monitors the servo identification signal SI and the write gate signal WG2 from the read/write channel 20 in the first mode, thereby detecting whether the write inhibition requirement is satisfied. Specifically, if the period in which the servo identification signal SI is asserted overlaps the period in which the write gate signal WG2 is asserted, the write inhibition controller 12 regards this overlapping period as the period in which the write inhibition requirement is satisfied (i.e., the HDD is in the write inhibition state). In the examples of FIGS. 4A and 4D, only during the period T3 from a time point t5 to a time point t6, both the servo identification signal SI and write gate signal WG2 are asserted. Therefore, the write inhibition controller 12 detects that the period T3 is the period in which the HDD is in the write inhibition state, thereby inhibiting the write gate signal WG2 from passing through the controller 12 during the period T3, with the level of the signal unchanged. In other words, in the first mode, the write inhibition controller 12 permits the write gate signal WG2 to pass therethrough and be output as the write gate signal WG2' through the output port 124 as shown in FIG. 4E, only when the servo identification signal SI is negated. As is apparent, the write gate signal WG2' is negated regardless of the state of the write gate signal WG2, when the servo identification signal SI is asserted.

The write gate signal WG2' output from the port 124 of the write inhibition controller 12 is transmitted to the switch SW3. At this time, the switch SW3 is in the ON state. Accordingly, the switch SW3 selects the write gate signal WG2'. The write gate signal WG2' selected by the switch SW3 is transmitted to the head IC 30 via the terminal 103 of the HDC 10. The state of the write gate signal WG2' is identical to that of the write gate signal WG2 output from the read/write channel 20, if the respective periods in which the servo identification signal SI and write gate signal WG2 are asserted does not overlap each other. Further, as described above, the period in which the write gate signal WG2 is asserted is longer than the write gate signal WG1 (=WG1a) by the encoding delay time (a delay time in a delay component between the HDC 10 and head IC 30).

When the write inhibition state is not detected, the head IC 30 causes the head 50 to write, into a target sector on the disk 40, the encoded write data, shown in FIG. 4H, output from the read/write channel 20 in accordance with the write gate signal WG2'. As a result, data writing considering the encoding delay time in the read/write channel 20 can be realized. On the other hand, when the write inhibition state is detected, the write gate signal WG2' reflects the write inhibition state. In other words, the write gate signal WG2' is forcibly negated during the period in which the write inhibition state is detected. Accordingly, during the period in which the write inhibition state is detected, the head IC 30 inhibits the head 50 from writing data to the disk 40. As a result, the servo data written in the servo area 410 is protected from breakage.

As described above, in the HDD of FIG. 2, servo data can be protected from breakage even if the read/write controller 11 negates the write gate signal WG1 before the write gate signal WG2 output from the read/write channel 20 is negated. The write inhibition controller 12 in the HDC 10 can be constructed so that it detects the write inhibition state, but generates no write gate signal WG2'. To realize this structure, it is sufficient if a circuit other than the write inhibition controller 12 inhibits data from being written to the disk 40 when the controller 12 detects the write inhibition state. In this case, the write gate signal WG2 from the read/write channel 20 is transmitted to the head IC 30 via the route 22 indicated by the broken line in FIG. 2, as well as to the terminal 102 of the HDC 10. This structure does not need the switch SW3 in the HDC 10.

Figure 5:
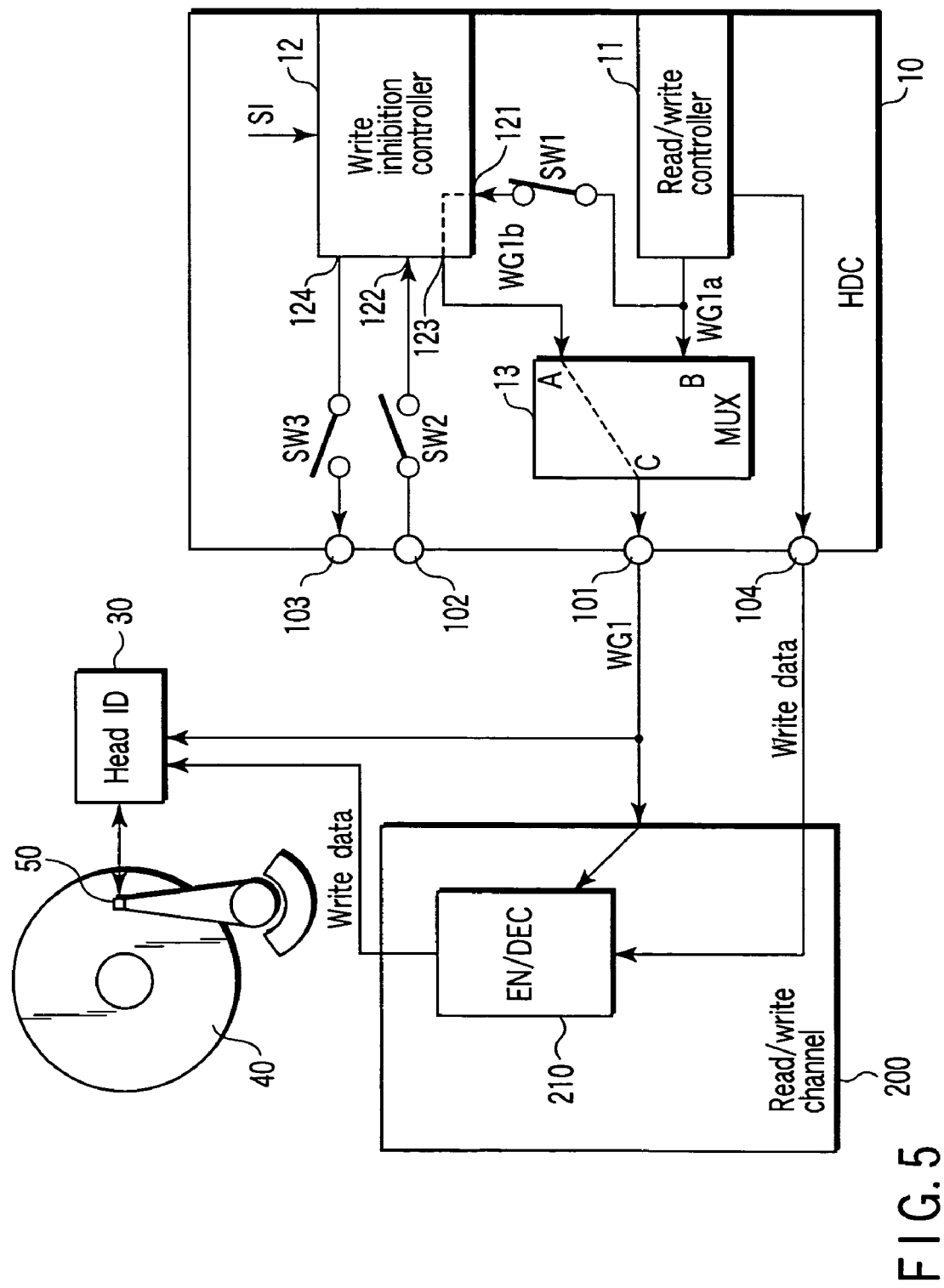
FIG. 5 is a block diagram of an essential part of a magnetic disk drive (HDD), useful in explaining the case where the disk controller shown in FIG. 1 is used in a second mode.

FIG. 5 is a block diagram of an essential part of the HDD, useful in explaining the case where the HDC 10 shown in FIG. 1 is used in the second mode. In FIG. 5, elements similar to those in FIG. 2 are denoted by corresponding reference numerals. As seen from FIG. 5, the HDC 10 is connected to the second read/write channel 200. The read/write channel 200 is connected to the head IC (head amplifier circuit) 30. The read/write channel 200 comprises an encoder/decoder (hereinafter referred to as an "ENDEC") 210 corresponding to the ENDEC 21 in FIG. 2. Unlike the ENDEC 21, the ENDEC 210 does not have a function for controlling the write gate signals in accordance with the progress of encoding therein. Therefore, in the second mode, the read/write controller 11 in the HDC 10 extends, by a predetermined delay time, the period in which the write gate signal WG1a is asserted, even after one-sector write data is output, considering the encoding delay time in the ENDEC 210 of the read/write channel 200.

In the second mode, the MUX 13 is set to select the input A. Further, the switches SW1, SW2 and SW3 are set in the ON, OFF and OFF states, respectively, as shown in FIG. 5. In this state, the write gate signal WG1a output from the read/write controller 11 is selected by the switch SW1 and input to the port 121 of the write inhibition controller 12. Thus, in the second mode, the use of the write gate signal WG1a for data writing inhibition control is permitted. In the second mode, the write inhibition controller 12 monitors the servo identification signal SI and the write gate signal WG1a selected by the switch SW1 to detect whether the write inhibition requirement is satisfied. Specifically, if the period in which the servo identification signal SI is asserted overlaps the period in which the write gate signal WG1a is asserted, the write inhibition controller 12 regards this overlapping period as the period in which the write inhibition requirement is satisfied (i.e., the HDD is in the write inhibition state). Only during this overlapping period, the write inhibition controller 12 inhibits the write gate signal WG1a from passing through the controller 12, with the level of the signal unchanged. In other words, in the second mode, the write inhibition controller 12 permits the write gate signal WG1a to pass therethrough and be output as the write gate signal WG1b through the output port 123, only when the servo identification signal SI is negated.

The write gate signal WG1b output from the write inhibition controller 12 is transmitted to the input A of the MUX 13. In the second mode, the MUX 13 selects the write gate signal WG1b transmitted to the input A, and outputs it as the write gate signal WG1 through the terminal 101. The write gate signal WG1 is input to the ENDEC 210 of the read/write channel 200, and to the head IC 30. The ENDEC 210 also receives one-sector write data output in units of bytes from the read/write controller 11 via the terminal 104 of the HDC 10. The ENDEC 210 encodes the input write data, and outputs the encoded write data to the head IC 30. The head IC 30 causes the head 50 to write, to a target sector on the disk 40, the write data from the ENDEC 210 in accordance with the write gate signal WG1 from the HDC 10.

As described above, in the second mode, the write gate signal WG1a output from the read/write controller 11 is used for write inhibition control executed by the write inhibition controller 12. The write gate signal WG1a reflects the encoding delay time in the read/write channel 200. After performing write inhibition control using the write gate signal WG1a, the write inhibition controller 12 outputs the write gate signal WG1b. The write gate signal WG1b is output as the write gate signal WG1 from the terminal 101 of the HDC 10. The write gate signal WG1 is used in the head IC 30 and read/write channel 200 (which does not have a function for controlling the write gate signals).

As is apparent from the above description, the HDC 10 of FIG. 1 can be used, connected to the read/write channel 20 that has a function for controlling the write gate signals, or connected to the read/write channel 200 that does not have a function for controlling the write gate signals. This means that if an HDD incorporates the HDC 10 shown in FIG. 1, it is compatible with read/write channels of various specifications. In other words, read/write channels produced by different makers can be used in HDDs of substantially the same recording density, which enables HDDs to be provided in a reliable manner and at low cost.

In the above embodiment, the state where the period in which the servo identification signal SI is asserted (the servo detection mode period) overlaps the period in which the write gate signal WG2 (in the first mode) or the write gate signal WG1a (in the second mode) is asserted is regarded as the requirement for write inhibition. Instead, the state where the period in which the rotational speed of a spindle motor (not shown) for rotating the disk 40 is not in a steady state (i.e., the rotational speed does not keep a predetermined value) overlaps the period in which the write gate signal WG2 or WG1a is asserted may be regarded as the requirement for write inhibition.

[Modification]

Figure 6:
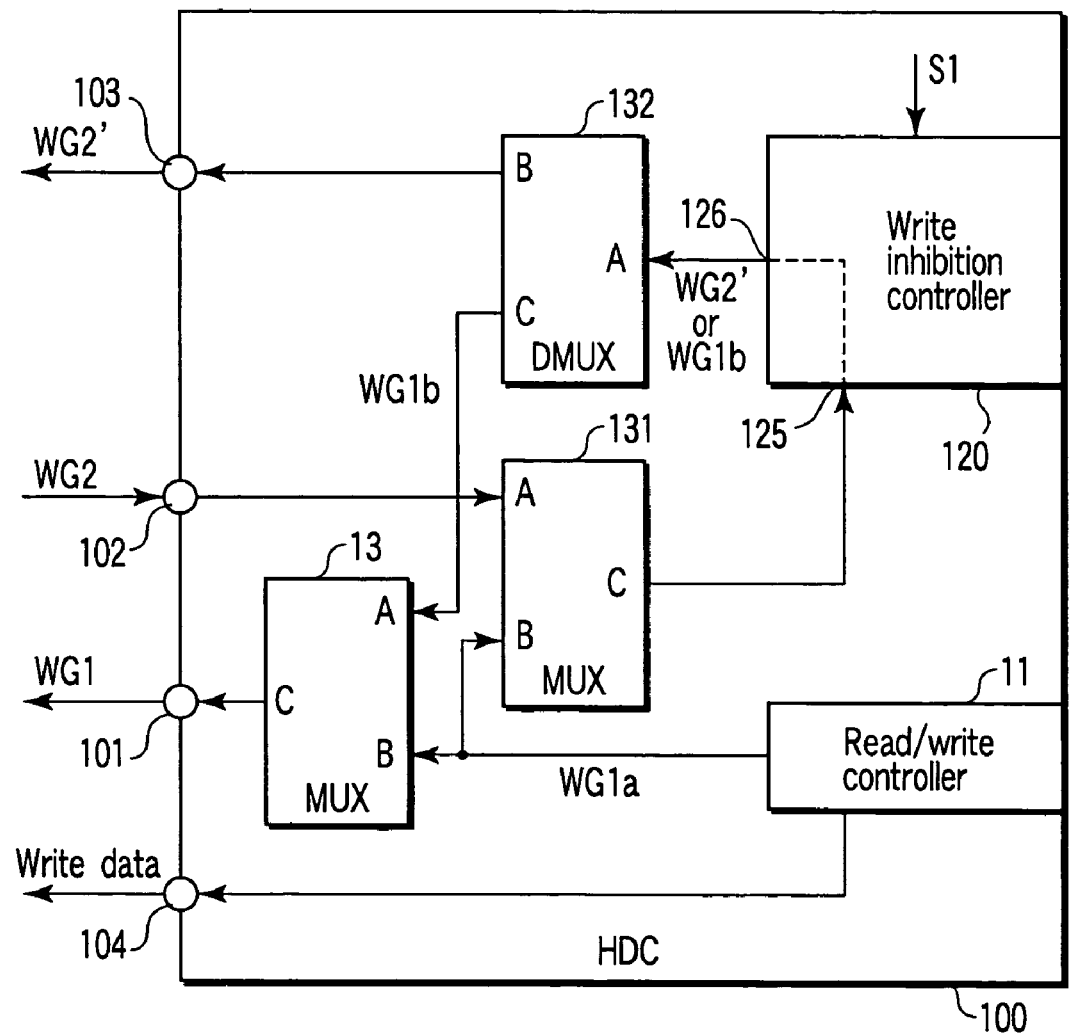
FIG. 6 is a block diagram illustrating a modification of the disk controller of FIG. 1.

FIG. 6 is a block diagram illustrating a modification of the disk controller of FIG. 1. In FIG. 6, elements similar to those in FIG. 1 are denoted by corresponding reference numerals. The HDC 100 shown in FIG. 6 incorporates, instead of the write inhibition controller 12, a write inhibition controller 120 that has a write gate signal input port 125 and write gate signal output port 126. The feature of the write inhibition controller 120 will now be described. In the case of the write inhibition controller 12 of FIG. 1, there are provided two write gate signal input ports, i.e., the port 121 for inputting the write gate signal WG1a and the port 122 for inputting the write gate signal WG2. There are also provided two write gate signal output ports, i.e., the port 123 for outputting the write gate signal WG1b and the port 124 for outputting the write gate signal WG2'. However, the write inhibition controller 12 does not simultaneously monitor the write gate signals WG2 and WG1a. On the other hand, in the HDC 100 of FIG. 6, the write gate signal input port 125 is used to input (monitor) the write gate signal WG2 in the first mode, and to input (monitor) the write gate signal WG1a in the second mode.

Therefore, the HDC 100 incorporates a MUX 131 and demultiplexer (hereinafter referred to as a "DMUX") 132, as well as the read/write controller 11, write inhibition controller 120 and MUX 13. Further, the HDC 100 has terminals 101 to 104, like the HDC 10 of FIG. 1. The MUX 131 is a two-input/one-output multiplexer having input A and B and output C. The input A of the MUX 131 is connected to the write gate signal WG2 transmitted from the outside of the HDC 100 (in this embodiment, from the read/write channel) to the terminal 102 of the HDC 100. The input B of the MUX 131 is connected to the write gate signal WG1a output from the read/write controller 11. The output C of the MUX 131 is connected to the port 125 of the write inhibition controller 120. The MUX 131 selects the input A (i.e., the write gate signal WG2) in the first mode, and the input B (i.e., the write gate signal WG1a) in the second mode. The write gate signal selected by the MUX 131 is input to the port 125 of the write inhibition controller 120. Thus, the MUX 131 selects the write gate signals input to the port 125 of the write inhibition controller 120 in accordance with the operation mode.

The write inhibition controller 120 detects the write inhibition state when the servo identification signal SI is valid, using, as the requirement for write inhibition, that the write gate signal (WG2 or WG1a) selected by the MUX 131 is asserted. When the servo identification signal SI is negated, the write inhibition controller 120 permits the write gate signal WG2 or WG1a to pass through the port 125 and to be output as the write gate signal WG2' or WG1b through the port 126, with the level of the signal unchanged. On the other hand, when the servo identification signal SI is asserted, the write inhibition controller 120 inhibits the write gate signal WG2 or WG1a from passing through the port 125. More specifically, only when the servo identification signal SI is asserted, the write inhibition controller 120 forcibly negates the write gate signal WG2 or WG1a input thereto, and outputs the negated write gate signal WG2' or WG1a as the write gate signal WG2' or WG1b through the port 126.

The write gate signal (WG2' or WG1b) output from the port 126 of the write inhibition controller 120 is input to the DMUX 132. The DMUX 132 is a one-input/two-output demultiplexer having an input A and outputs B and C. The input A of the DMUX 132 is connected to the port 126 of the write inhibition controller 120. The output B of the DMUX 132 is connected to the terminal 103 of the HDC 100, while the output C of the DMUX 132 is connected to the input A of the MUX 13. The DMUX 132 selects the output B in the first mode, and the output C in the second mode. As a result, in the first mode, the write gate signal WG2' output from the port 126 of the write inhibition controller 120 and input to the input A of the DMUX 132 is output from the output B of the DMUX 132 to the outside of the HDC 100 via the terminal 103. On the other hand, in the second mode, the write gate signal WG1b output from the port 126 of the write inhibition controller 120 and input to the input A of the DMUX 132 is transmitted from the output C of the DMUX 132 to the input A of the MUX 13. In other words, the DMUX 132 is used as an output-switching device for switching the output destination of the write gate signal input to the input A. The write gate signal WG1a output from the read/write controller 11 is transmitted to the input B of the MUX 13.

As in the case of the HDC shown in FIG. 1, the MUX 13 selects the input B in the first mode, and the input A in the second mode. Accordingly, in the first mode, the write gate signal WG1a output from the read/write controller 11 is selected and output as the write gate signal WG1 to the outside of the HDC 100 via the terminal 101. In the second mode, the write gate signal WG1b output from the DMUX 132 is selected and output as the write gate signal WG1 to the outside of the HDC 100 via the terminal 101. From this, it is apparent that the HDC 100 of FIG. 6 can be used in place of the HDC 10 of FIG. 1. In other words, the HDC 100 can be connected to the read/write channel 20 in FIG. 2, and to the read/write channel 200 in FIG. 5.

Although in the above-described embodiments, the invention is incorporated in a magnetic disk drive (HDD), it is also applicable to disk drives, other than magnetic disk drives, such as optical disk drives and magneto-optical disk drives.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk controller for controlling reading and writing of data from and to a disk, comprising:
   a first terminal used to output a first write gate signal which dictates writing of data to the disk;
   a second terminal used to input a second write gate signal output from an external circuit, the external circuit performing predetermined signal processing on write data in accordance with the first write gate signal output from the first terminal, and outputting the second write gate signal, the second write gate signal reflecting a signal delay in the predetermined signal processing; and
   a write inhibition controller which monitors the second write gate signal input via the second terminal, and detects, as a write inhibition state, a state in which writing of data to the disk is dictated during a period in which writing of data to the disk should be inhibited.

2. The disk controller according to claim 1, wherein:
   the external circuit is a signal processing circuit, the signal processing circuit performing the signal processing on write data in accordance with the first write gate signal output from the first terminal, and outputting the processed write data to a head amplifier circuit, the signal processing circuit also outputting the second write gate signal, a period in which the second write gate signal is valid being longer, by a time corresponding to a delay time in the predetermined signal processing, than a period in which the first write gate signal is valid, the head amplifier circuit causing a head to read or write data from or to the disk; and
   the second terminal is used to input the second write gate signal output from the signal processing circuit.

3. The disk controller according to claim 2, further comprising a read/write controller which outputs a third write gate signal, together with the write data used in the predetermined signal processing by the signal processing circuit, the third write gate signal being used as the first write gate signal output from the first terminal.

4. The disk controller according to claim 3, wherein the write inhibition controller outputs the second write gate signal as a fourth write gate signal in a normal state, without changing a state of the second write gate signal, the write inhibition controller negating the second write gate signal and outputting the negated second write gate signal as the fourth write gate signal in the write inhibition state, the fourth write gate signal being used to instruct the head amplifier circuit to write data to the disk.

5. The disk controller according to claim 4, further comprising a third terminal used to output, to an outside of the disk controller, the fourth write gate signal supplied from the write inhibition controller.

6. The disk controller according to claim 5, wherein the third terminal is used to output, to the head amplifier circuit, the fourth write gate signal supplied from the write inhibition controller.

7. The disk controller according to claim 1, wherein the disk is provided with a plurality of servo areas extending radially at circumferentially regular intervals, and a period in which writing of data to the disk should be inhibited corresponds to a period in which a head is passing through one of the plurality of servo areas.

8. The disk controller according to claim 1, wherein the disk is rotated by a spindle motor, and a period in which writing of data to the disk should be inhibited corresponds to a period in which a rotational speed of the spindle motor is in a non-steady state.

9. A disk drive comprising:
   a disk controller for controlling reading and writing of data from and to a disk, the disk controller including:
      a first terminal used to output a first write gate signal which dictates writing of data to the disk;
      a second terminal used to input a second write gate signal;

a read/write controller which outputs, together with write data, a third write gate signal used as the first write gate signal output through the first terminal;

a third terminal used to output a fourth write gate signal to an outside of the disk controller; and a write inhibition controller which monitors the second write gate signal input via the second terminal, and detects, as a write inhibition state, a state in which writing of data to the disk is dictated during a period in which writing of data to the disk should be inhibited, the write inhibition controller outputting the second write gate signal as the fourth write gate signal in a normal state without changing a state of the second write gate signal, the write inhibition controller negating the second write gate signal and outputting the negated second write gate signal as the fourth write gate signal in the write inhibition state;

a signal processing circuit connected to the disk controller via the first and second terminals of the disk controller, the signal processing circuit performing predetermined signal processing on write data in accordance with the first write gate signal output through the first terminal, and outputting the second write gate signal, a valid period of the second write gate signal being longer than the first write gate signal by a time corresponding to a delay time in the predetermined signal processing; and a head amplifier circuit which causes a head to write, to the disk, the write data processed by the signal processing circuit in accordance with the fourth write gate signal output through the third terminal of the disk controller.

10. A method of controlling inhibition of writing of data to a disk, for use in a disk drive in which reading and writing of data from and to the disk is performed using a head under control of a disk controller via a signal processing circuit and a head amplifier circuit, the method comprising:

outputting a first write gate signal and write data from the disk controller to the signal processing circuit, the first write gate signal instructing the signal processing circuit to write the write data;

performing predetermined signal processing on the write data in accordance with the first write gate signal output from the disk controller to the signal processing circuit;

outputting a second write gate signal corresponding to the first write gate signal from the signal processing circuit to the disk controller, the second write gate signal reflecting a signal delay in the predetermined signal processing;

detecting, as a write inhibition state, a state in which an instruction to write data to the disk is issued during a period in which writing of data to the disk should be inhibited, in accordance with the second write gate signal output from the signal processing circuit to the disk controller; and outputting, from the disk controller to the head amplifier circuit, the second write gate signal as a fourth write gate signal in a normal state, without changing a state of the second write gate signal, the fourth write gate signal instructing writing, to the disk, of the write data processed by the signal processing circuit; and negating the second write gate signal in the write inhibition state, and outputting, from the disk controller to the head amplifier circuit, the negated second write gate signal as the fourth write gate signal in the write inhibition state.

* * * * *